Feb. 11, 1930.  R. C. HAWKINS  1,746,938
TRACTOR SEAT SUPPORT
Filed June 13, 1927
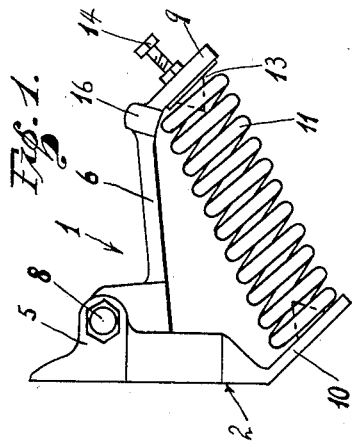
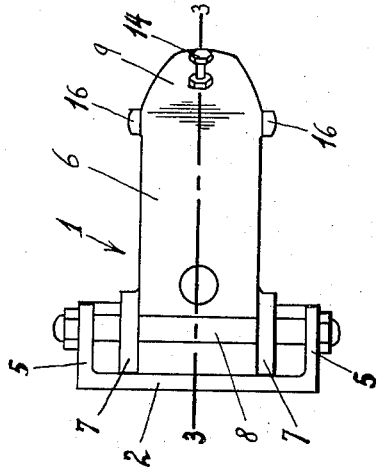
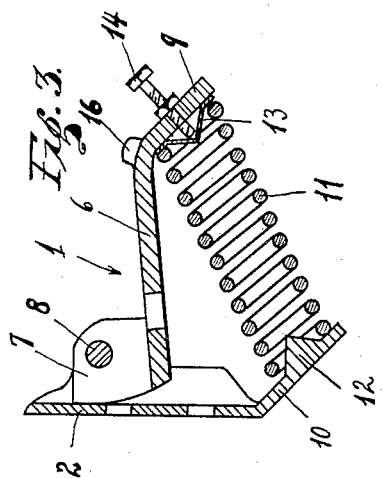
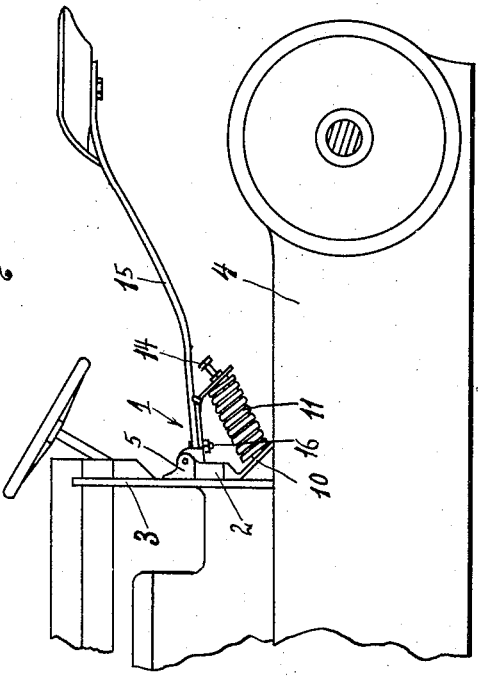
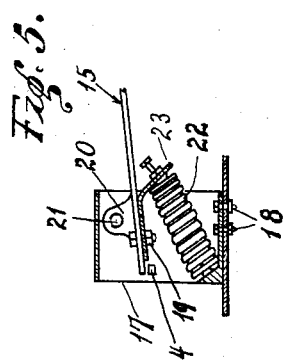
INVENTOR.
ROE C. HAWKINS.
BY
ATTORNEY Patented Feb. 11, 1930

1,746,938

UNITED STATES PATENT OFFICE

ROE C. HAWKINS, OF LONG BEACH, CALIFORNIA, ASSIGNOR OF ONE-HALF TO E. S. HIXSON, OF LONG BEACH, CALIFORNIA

TRACTOR-SEAT SUPPORT

Application filed June 13, 1927. Serial No. 198,493.

An object of my invention is to provide a support of a tractor seat in which no great strain is placed upon any of the operating parts thereof.

Another object is to provide a spring support for tractor seats which is effective for both light and heavy loads on the seat.

Still another object is to provide a seat support which is simple in construction, inexpensive to manufacture, and effective in operation.

Other objects, advantages and features of invention may appear from the accompanying drawing, the subjoined detailed description, and the appended claims.

In the drawing:

Fig. 1 is a side elevation of my support.

Fig. 2 is a plan view of the same.

Fig. 3 is a sectional view taken on line 3, 3, Fig. 2.

Fig. 4 is a fragmentary side elevation of a tractor with my support in position thereon.

Fig. 5 is a transverse sectional view of a slightly modified form of support.

Referring more particularly to the drawing:

My seat support 1 comprises a mounting plate or bracket 2 which is preferably so arranged as to be bolted to the vertical dash 3 of the tractor. The lower end of the plate 2 rests on the transmission housing 4 and is supported thereby. A pair of lugs 5, 5 are formed on the plate 2 and a cradle 6 is positioned between the lugs 5, 5. A pair of upstanding ears 7, 7 are formed on the rear end of the cradle 6 and a bolt 8 extends through the lugs 5 and ears 7, thus pivotally mounting the cradle on the plate 2.

The forward end of the cradle 6 is bent downwardly into a lip 9 and the lower end of the plate 2 has an incline base 10. A coil spring 11 is positioned between the base 10 and lip 9, said spring being held in position on the base by the conical tip 12. A conical washer 13 rests on the top of the spring 11 and a set screw 14 extends through the lip 9 and rests in the conical washer 13. The set screw 14 provides a tension adjustment for the spring and also provides a rocking point for the cradle 6 as said cradle swings on the bolt 8.

The ears 7 are so arranged as to contact with the plate 2 in the raised position of the cradle 6, thus limiting the upward movement of said cradle. The seat plate 15 rests on the cradle 6 and is secured thereto by the bolt 16, or the like, and a pair of lugs 16, 16 project upwardly from the edge of the cradle 6 and engage the side of the plate 15, thus preventing any side movement in the seat.

In certain tractors it is not desirable to mount the seat support on the dash and for this type of tractor I provide a stirrup 17 which is bolted, as at 18, to the crank case housing, or the like. The cradle 19 is provided with ears 20 and a bolt 21 extends through the stirrup and ears, thus pivotally mounting the cradle. A coil spring 22 extends between the rear of the stirrup 17 and a downwardly inclined lip 23 on the cradle. The adjustment for the spring is the same as previously described, and similarly the seat plate 15 is secured to the cradle 19.

A stop lug 24 may be provided on the stirrup 17 which lug is engaged by the rear end of the plate 15 to limit the upward movement of the seat.

It will be observed that in my construction I position the pivot of the support above the spring thus providing a more effective spring cushion for the seat, in that the pressure is directed substantially in line with the longitudinal axis of the spring.

Having described my invention, I claim:

1. A seat support for tractors and the like comprising a bracket, a pair of lugs formed on said bracket, a cradle, ears on said cradle, a bolt extending through said lugs and ears whereby the cradle is pivotally mounted, a downwardly inclined lip on said cradle, a spring positioned between said lip and the bracket, and a set screw extending through said lip and bearing against said spring.

2. A seat support for tractors and the like comprising a bracket, a pair of lugs formed on said bracket, a cradle, ears on said cradle, a bolt extending through said lugs and ears whereby the cradle is pivotally mounted, a downwardly inclined lip on said cradle, a spring positioned between said lip and the bracket, a conical washer on said spring, and a set screw extending through said lip and into said washer whereby the tension of the spring may be adjusted.

In testimony whereof, I affix my signature.

ROE C. HAWKINS.